(12) United States Patent
Shen

(10) Patent No.: US 7,952,681 B2
(45) Date of Patent: May 31, 2011

(54) SPACER STRUCTURE

(75) Inventor: Po-Yuan Shen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 225 days.

(21) Appl. No.: 12/327,819

(22) Filed: Dec. 4, 2008

(65) Prior Publication Data

US 2010/0007843 A1   Jan. 14, 2010

(30) Foreign Application Priority Data

Jul. 8, 2008   (TW) .............................. 97125696 A

(51) Int. Cl.
*G02F 1/1333* (2006.01)

(52) U.S. Cl. ......... 349/156; 349/155; 349/109; 349/110

(58) Field of Classification Search .......... 349/155–156, 349/109–110
See application file for complete search history.

(56) References Cited

U.S. PATENT DOCUMENTS

| 6,795,141 | B2 | 9/2004 | Yamada |
| 6,870,593 | B2 | 3/2005 | Satoh |
| 7,304,712 | B2 * | 12/2007 | Sawasaki et al. ............. 349/156 |
| 2003/0072017 | A1 | 4/2003 | Sato |
| 2003/0112405 | A1 * | 6/2003 | Kim et al. ..................... 349/156 |
| 2006/0028598 | A1 | 2/2006 | Lee |

* cited by examiner

*Primary Examiner* — David Nelms
*Assistant Examiner* — Phu Vu
(74) *Attorney, Agent, or Firm* — Winston Hsu; Scott Margo

(57) ABSTRACT

A spacer structure includes a first substrate, an overcoat layer, first spacers, second spacers, and a second substrate. The first spacers are disposed in a first region, and the overcoat layer has a first thickness in the first region. The second spacers are disposed in a second region, and the overcoat layer has a second thickness in the second region. The first spacers and the second spacers have the same height, and the first thickness is greater than the second thickness. Accordingly, no gap exists between each of the first spacers and the second substrate; however, a gap exists between each or the second spacers and the second substrate.

17 Claims, 6 Drawing Sheets

SPACER STRUCTURE

BACKGROUND OF THE INVENTION

1. Field of the Invention

The present invention relates to a spacer structure, and more particularly, to a spacer structure which is disposed in a display panel for enhancing the compression strength of the display panel.

2. Description of the Prior Art

A liquid crystal display (LCD) panel is mainly composed of a thin film transistor substrate (TFT substrate), a color filter substrate (CF substrate), and liquid crystal molecules filled between the TFT substrate and the CF substrate. In order to provide stable display quality, spacers are installed between the TFT substrate and the CF substrate so that the cell gap between the TFT substrate and the CF substrate can be maintained.

FIG. 1 is a schematic diagram illustrating conventional spacers. As shown in FIG. 1, the conventional spacers 10 are disposed between a TFT substrate 12 and a CF substrate 14 of a display panel, where an overcoat layer 16 is disposed between each of the spacers 10 and the CF substrate 14, and a spacer pad 18 is disposed between each of the spacers 10 and the TFT substrate 12.

As shown in FIG. 1, the conventional spacers 10 have the same height, the spacer pads 18 have the same thickness, and the overcoat layers 16 have the same thickness. Accordingly, the display panel has a uniform cell gap by virtue of the spacers 10, the spacer pads 18 and the overcoat layers 16 with the same height or thickness under normal condition. The display panel, however, may be inevitably compressed by external forces when used. In such a case, breakage or permanent deformation may occur to the substrates easily due to the insufficient buffer effect against external compression of the conventional spacers 10.

In order to improve the tolerance against external compression, another spacer design has been proposed. FIG. 2 is a schematic diagram illustrating other conventional spacers. As shown in FIG. 2, the conventional spacers 10 have the same height, but the spacer pads 18 are installed only in some regions (e.g. main regions), while no spacer pads are installed in other regions (e.g. subsidiary regions). In other words, the spacer pads 18 are arranged in a manner such that the spacers 10 and the spacer pads 18 are in contact to each other in the main regions, while a gap is formed between each of the spacers 10 and the TFT substrate 12 in the sub regions. Therefore, external compression forces may be buffered. The TFT substrate 12 and the CF substrate 14, however, are fabricated by different manufacturers, which may affect the integrity of the display panel. Also, the alignment error of the TFT substrate 12 and the CF substrate 14 would influence the relative position between the spacer pad 18 and the spacer 10, which would deteriorate the buffer effect with respect to external compression forces.

SUMMARY OF THE INVENTION

It is therefore one of the objectives of the present invention to provide a spacer structure to increase the compression strength of a display panel.

According to the present invention, a spacer structure is provided. The spacer structure includes a first substrate, an overcoat layer, a plurality of first spacers, a plurality of second spacers, and a second substrate. The overcoat layer is disposed on the substrate, includes a plurality of first regions and second regions, and has a first thickness in the first regions and a second thickness in the second regions. The first spacers are disposed on the overcoat layer in the first regions, and the second spacers are disposed on the overcoat layer in the second regions. The second substrate is disposed opposite to the first substrate. the first thickness of the overcoat layer in the first regions is greater than the second thickness of the overcoat layer in the second regions, such that the first spacers are in contact with the second substrate, and a gap exists in between each of the second spacers and the second substrate.

According to the present invention, a display panel having a first region and a second region defined thereon is provided. The display panel includes a first substrate, a second substrate, an overcoat layer, a first spacer, and a second spacer. The second substrate is disposed opposite to the first substrate. The overcoat layer is disposed on the first substrate, wherein the overcoat has a first thickness in the first region, and a second thickness in the second region, and the first thickness is greater than the second thickness. The first spacer is disposed on the overcoat layer in the first region, and the second spacer is disposed on the overcoat layer in the second region. No gap exists in between the first spacer and the second substrate in the first region, and a gap exists in between the second spacer and the second substrate in the second region.

The overcoat layer has different thickness in different regions such that on gap exists between the first spacer and the second substrate and a gap exists between the second spacer and the substrate. As a result, the mechanical strength is enhanced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
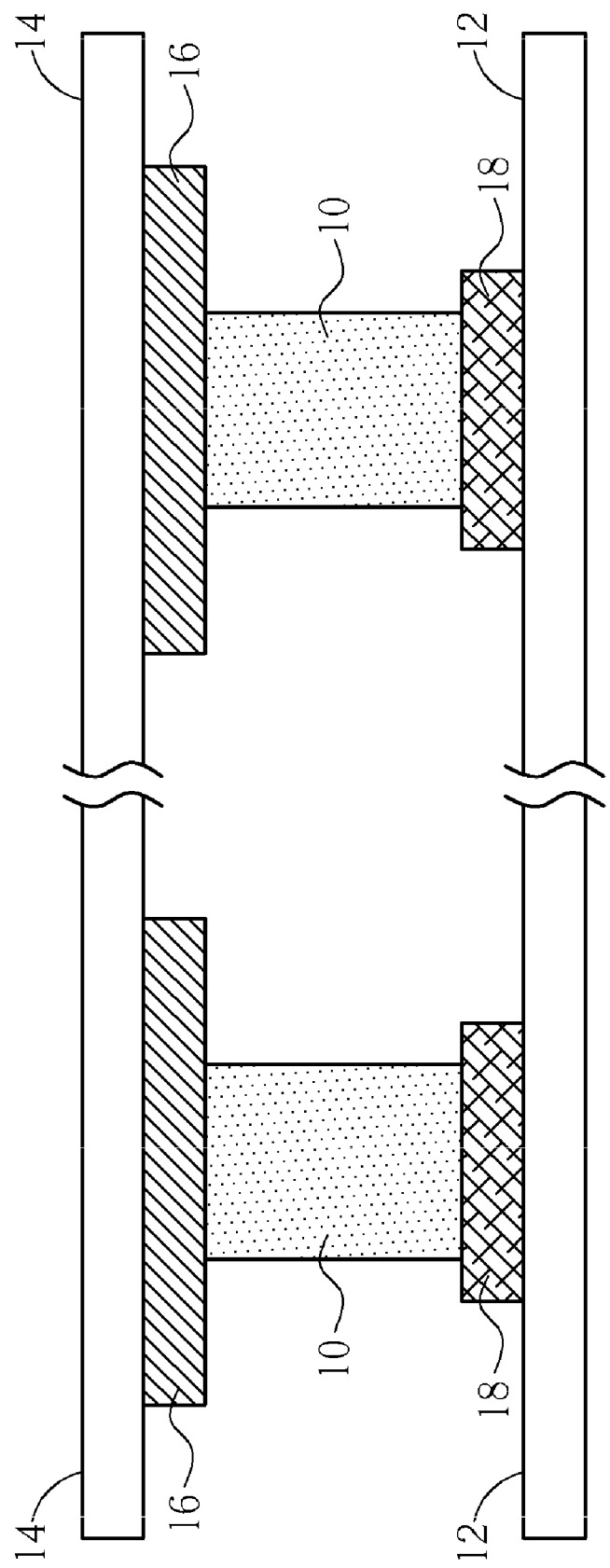
FIG. 1 is a schematic diagram illustrating conventional spacers.
Figure 2:
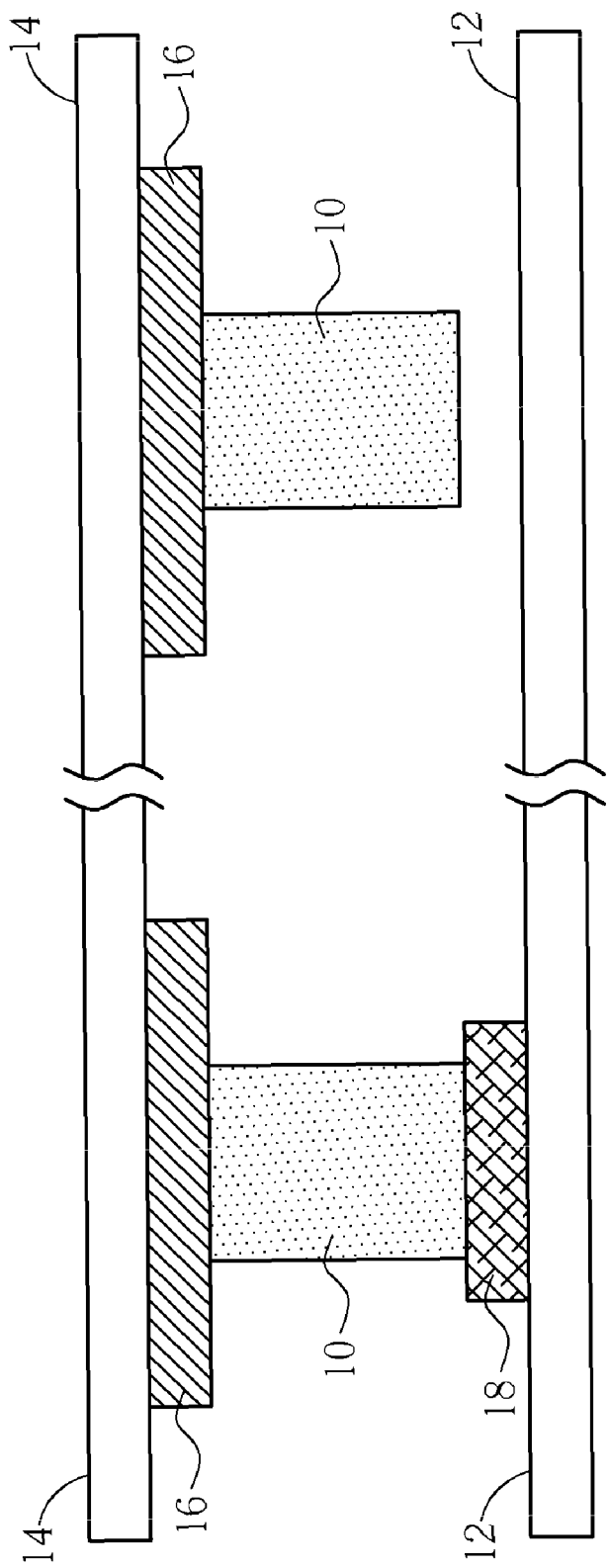
FIG. 2 is a schematic diagram illustrating other conventional spacers.
Figure 3:
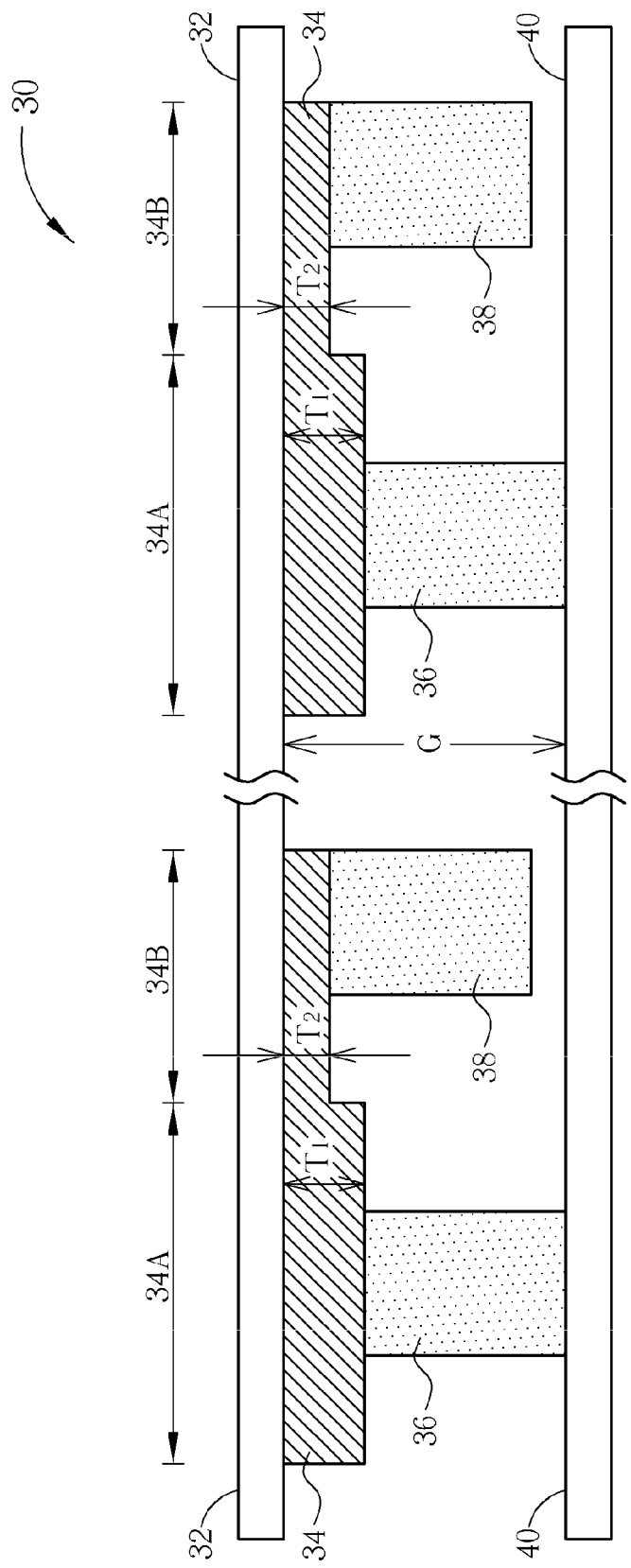
FIG. 3 is a schematic diagram illustrating a spacer structure according to a preferred embodiment of the present invention.

FIG. 3 is a schematic diagram illustrating a spacer structure according to a preferred embodiment of the present invention. As shown in FIG. 3, the spacer structure 30 includes a first substrate 32, an overcoat layer 34, a plurality of first spacers 36, a plurality of second spacers 38, and a second substrate 40. The overcoat layer 34 is disposed on the surface of the first substrate 32. The first substrate 32 and the second substrate 40 are disposed oppositely. The overcoat layer 34 includes a plurality of first regions 34A and second regions 34B, where the overcoat layer 34 has a first thickness T1 in the first regions 34A, and a second thickness T2, which is less than the first thickness T1, in the second regions 34B. The first spacers 36 are disposed on the surface of the overcoat layer 34 in the first regions 34A, and the second spacers 38 are disposed on the surface of the overcoat layer 34 in the second regions 34B.

The spacer structure 30 is disposed in a display panel e.g. an LCD panel, to maintain a constant cell gap between the first substrate 32 and the second substrate 40. The first substrate 32 and the second substrate 40 are disposed oppositely. In this embodiment, the first substrate 32 may be for instance a CF substrate, and the second substrate 40 may be a TFT substrate, but not limited. The first substrate 32 may also be the TFT substrate, and the second substrate 40 may also be a CF substrate for example. The first spacers 36 and the second spacers 38 are configured to define the cell gap G between the first substrate 32 and the second substrate 40, and also to enhance the mechanical strength of the display panel. Based on the above requirement, the material of the first spacers 36 and the second spacers 38 is preferably elastic material e.g. resin, so as to increase the recovery of the display panel after compressed. Considering process facility, the material of the first spacers 36 and the second spacers 38 is more preferably photosensitive material, which can be accurately patterned by an exposing and developing. In this embodiment, photosensitive resin is used as the material of the first spacers 36 and the second spacers 38, but the material of the first spacers 36 and the second spacers 38 may be any other suitable material e.g. non-photosensitive resin. The non-photosensitive resin may be elastic, and formed in some particular regions e.g. the first regions 34A and the second regions 34B of the overcoat layer 34 by inkjet printing for instance. Also, the size and position of the first spacers 36 and the second spacers 38 can be precisely controlled. In this embodiment, the overcoat layer 34 may be a black matrix (BM) layer made of opaque material e.g. metal or resin with black dyes so that light leakage may be shielded. In addition, since the overcoat layer 34 has different thickness, the overcoat layer 34 may include photosensitive material, and different thickness of the overcoat layer 34 may be formed by one or more exposure processes. The first spacers 36, the second spacers 38, and the overcoat layer 34 are preferably made of photosensitive material, but the property requirements of the spacers and the overcoat layer 34 are different due to their distinct functions. For instance, the elasticity is a concern when selecting the material of the spacers, while the process compatibility, the flatness and the light-shielding effect should be considered when selecting the material of the overcoat layer 34.

In this embodiment, the first spacers 36 and the second spacers 38 have substantially the same height, but not limited. The first thickness T1 of the overcoat layer 34 in the first regions 34A is greater than the second thickness T2 of the overcoat layer 34 in the second regions 34B. When the first substrate 32 and the second substrate 40 are assembled, the first spacers 36 are in contact with the second substrate 40 and no gap exists therebetween, and a gap exists between each of the second spacers 38 and the second substrate 40 due to the thinner second thickness T2 of the overcoat layer 34 in the second regions 34B. Preferably, the thickness difference between the first thickness T1 and the second thickness T2 is less than or equal to one third of the cell gap G, i.e. (T1−T2) ≦(⅓)G. The relation of the first thickness T1, the second thickness T2, and the cell gap G is not limited by the above embodiment, and those skilled in the art may modify the relation of the first thickness T1, the second thickness T2 based on different requirements. By virtue of the aforementioned design, the first spacers 36 can maintain the cell gap G under normal conditions, while the second spacers 38 can restrain the substrate from being deformed excessively so that the compression strength of the display panel is improved.

Figure 4:
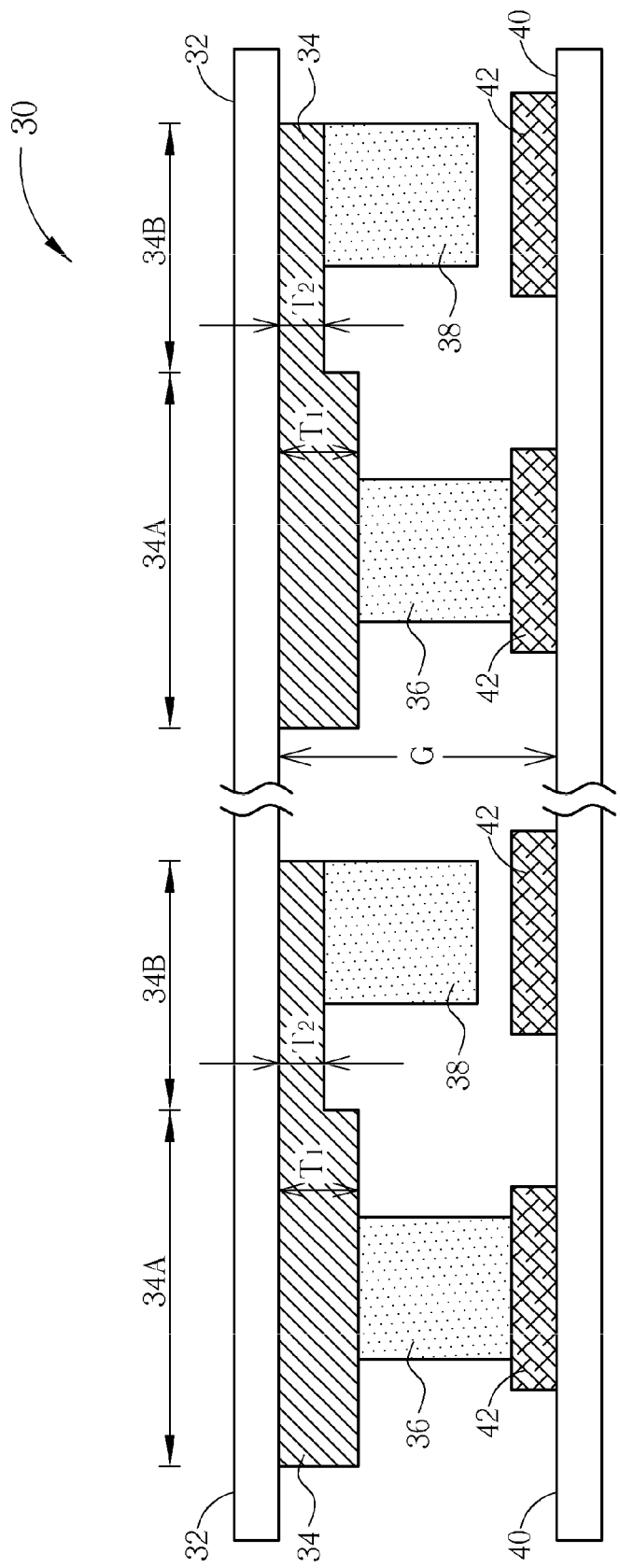
FIG. 4 is a schematic diagram illustrating a spacer structure according to another embodiment of the present invention.

FIG. 4 is a schematic diagram illustrating a spacer structure according to another embodiment of the present invention. In order to compare the difference, identical components are denoted by identical numerals. As shown in FIG. 4, the spacer structure 30 further includes spacer pads 42 disposed on the second substrate 40. Preferably, the spacer pads 42 have the same thickness, and are in contact with the first spacers 36 in the first regions 34A so that no gap exists between each of the first spacers 36 and corresponding spacer pad 42. In the second regions 34B, a gap exists between each of the second spacers 38 and corresponding spacer pad 42.

It can be seen that the thickness of the overcoat layer is different in different regions so that no gap exists between the first spacers 36 and the second substrate 40, and a gap forms between each of the second spacers 38 and the second substrate 40. Consequently, the compression strength of the display panel is improved. In addition, the first spacers 36 and the second spacers 38 can be photosensitive material such that they can be accurately patterned by exposing and developing. Also, the size and position of the first spacers 36 and the second spacers 38 can be precisely controlled. In this embodiment, the material of the first spacers 36 and the second spacers 38 is photosensitive resin, but not limited. Other material e.g. non-photosensitive material may be used. For instance, non-photosensitive material with elasticity may be formed by inkjet printing in particular regions e.g. the first regions 34A and the second regions 34B of the overcoat layer 34.

Figure 5:
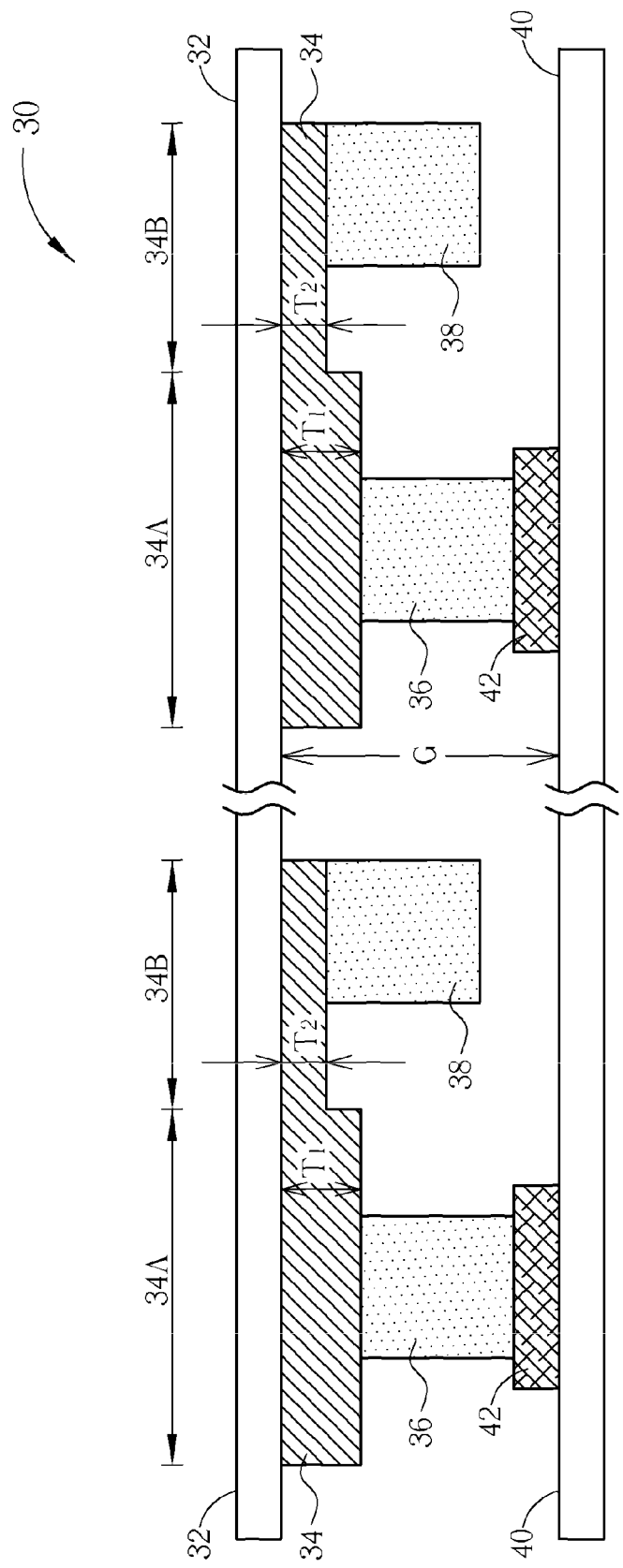
FIGS. 5 and 6 are schematic diagrams illustrating a spacer structure according to another two embodiments of the present invention.
Figure 6:
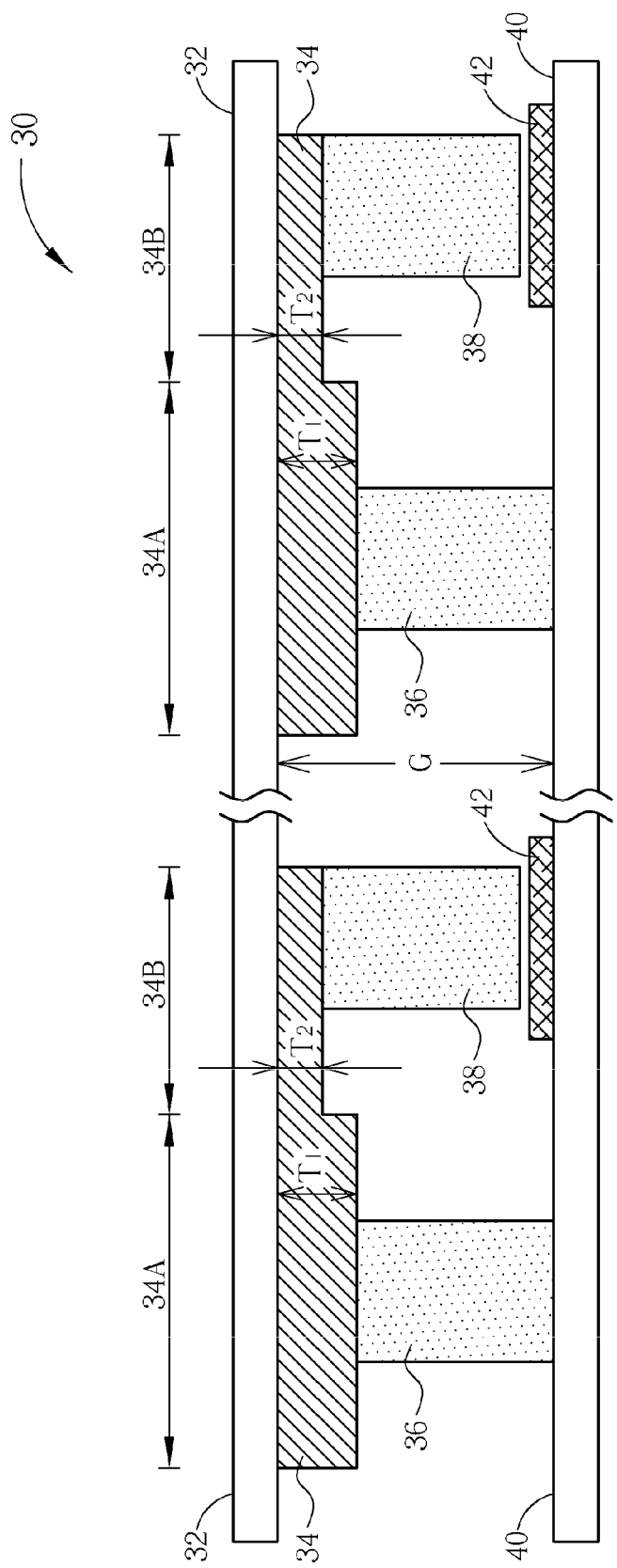

FIGS. 5 and 6 are schematic diagrams illustrating a spacer structure according to another two embodiments of the present invention. In order to compare the difference, identical components are denoted by identical numerals. In the embodiment of FIG. 5, spacer pads 42 are disposed on the second substrate 40 corresponding to the first spacers 36 in the first regions 34A, but no spacer pads 42 are disposed on the second substrate 40 in the second regions 34B. The spacer pads 42 preferably have the same thickness such that the first spacers 36 are in contact with the spacer pads 42 in the first regions 34A and no gap exists between each of the first spacers 36 and the spacer pad 42. In the second regions 34B, a gap is formed between each of the second spacers 38 and the second substrate 40. In the embodiment of FIG. 6, spacer pads 42 are disposed on the second substrate 40 corresponding to the second spacers 38 in the second regions 34B, but no spacer pads 42 are disposed on the second substrate 40 in the first regions 34A. Preferably, the first spacers 36 are in contact with the second substrate 40 in the first regions 34A such that no gap exist between each of the first spacers 36 and the second substrate 40 and a gap exists between each of the second spacers 38 and the spacer pad 42. In addition, the first spacers 36 and the second spacers 38 can be photosensitive material such that they can be accurately patterned by exposing and developing. Also, the size and position of the first spacers 36 and the second spacers 38 can be precisely controlled. In this embodiment, the material of the first spacers 36 and the second spacers 38 is photosensitive resin, but not limited. Other material e.g. non-photosensitive material may be used. For instance, non-photosensitive material with elasticity may be formed by inkjet printing in particular regions e.g. the first regions 34A and the second regions 34B of the overcoat layer 34.

Those skilled in the art will readily observe that numerous modifications and alterations of the device and method may be made while retaining the teachings of the invention.

What is claimed is:

1. A spacer structure, comprising:
   a first substrate;
   an overcoat layer disposed on the substrate, the overcoat layer comprising a plurality of first regions and second regions, and the overcoat layer having a first thickness in the first regions, and a second thickness in the second regions, wherein the overcoat layer comprises a black matrix layer;

a plurality of first spacers disposed on the overcoat layer in the first regions;

a plurality of second spacers disposed on the overcoat layer in the second regions; and a second substrate disposed opposite to the first substrate;

wherein the first thickness of the overcoat layer in the first regions is greater than the second thickness of the overcoat layer in the second regions, the first spacers are in contact with the second substrate, and a gap exists between each of the second spacers and the second substrate.

2. The spacer structure of claim 1, wherein at least one of the first spacers and the second spacers comprises a photosensitive material.

3. The spacer structure of claim 2, wherein the photosensitive material comprises photosensitive resin.

4. The spacer structure of claim 1, wherein at least one of the first spacers and the second spacers comprises a non-photosensitive material.

5. The spacer structure of claim 1, wherein the non-photosensitive material comprises non-photosensitive resin.

6. The spacer structure of claim 1, wherein the first spacers and the second spacers have the same height.

7. The spacer structure of claim 1, further comprising a plurality of spacer pads disposed between each of the first spacers and the second substrate respectively.

8. The spacer structure of claim 1, further comprising a plurality of spacer pads disposed between each of the second spacers and the second substrate.

9. A display panel having a first region and a second region defined thereon, the display panel comprising:

a first substrate;

a second substrate disposed opposite to the first substrate;

an overcoat layer disposed on the first substrate, wherein the overcoat has a first thickness in the first region, and a second thickness in the second region, wherein the first thickness is greater than the second thickness, wherein the overcoat layer comprises a black matrix layer;

a first spacer disposed on the overcoat layer in the first region; and a second spacer disposed on the overcoat layer in the second region;

wherein no gap exists between the first spacer and the second substrate in the first region, and a gap exists between the second spacer and the second substrate in the second region.

10. The display device of claim 9, wherein at least one of the first spacer and the second spacer comprises a photosensitive material.

11. The display device of claim 10, wherein the photosensitive material comprises photosensitive resin.

12. The display device of claim 9, wherein at least one of the first spacer and the second spacer comprises a non-photosensitive material.

13. The display device of claim 12, wherein the non-photosensitive material comprises non-photosensitive resin.

14. The display device of claim 9, wherein a cell gap exists between the first substrate and the second substrate, and a difference between first thickness and the second thickness is less than or equal to one third of the cell gap.

15. The display device of claim 9, wherein the first spacer and the second spacer have the same height.

16. The display device of claim 9, further comprising a spacer pad disposed between the first spacer and the second substrate.

17. The display device of claim 9, further comprising a spacer pad disposed between the second spacer and the second substrate.

* * * * *